United States Patent
Yang

(10) Patent No.: US 7,213,585 B2
(45) Date of Patent: May 8, 2007

(54) SYSTEM AND METHOD FOR MAINTAINING HEATED INTAKE AIR

(75) Inventor: Jialin Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/233,171

(22) Filed: Sep. 21, 2005

(65) Prior Publication Data

US 2007/0062490 A1 Mar. 22, 2007

(51) Int. Cl.
*F02G 5/00* (2006.01)
*F02M 7/00* (2006.01)

(52) U.S. Cl. ....................... 123/543; 123/435

(58) Field of Classification Search .............. 123/27 R, 123/543, 435; 60/599, 605.2, 611, 564
See application file for complete search history.

(56) References Cited

U.S. PATENT DOCUMENTS

| | | | |
|---|---|---|---|
| 5,036,668 A | 8/1991 | Hardy | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 | 8/2005 | Flowers | |
| 6,932,175 B2 | 8/2005 | Teraji et al. | |
| 2004/0065279 A1 | 4/2004 | Hitomi et al. | |
| 2004/0182359 A1 | 9/2004 | Stewart et al. | |
| 2005/0121008 A1 | 6/2005 | Kikenny et al. | |
| 2005/0173169 A1 | 8/2005 | Gray, Jr. | |

OTHER PUBLICATIONS

O. Lang et al, "Thermodynamical and Mechanical Approach Towards a Variable Valve Train for the Controlled Auto Ignition Combustion Process," SAE Technical Paper No. 2005-01-07, Apr. 11-14, 2005.

*Primary Examiner*—John T. Kwon
(74) *Attorney, Agent, or Firm*—Allan J. Lippa; Alleman Hall McCoy Russell Tuttle LLP

(57) ABSTRACT

A system for an internal combustion engine, the engine having an intake and exhaust manifold, the system comprising a heat exchanger configured to extract energy from at least a heat source that heats a first portion of intake air, a spark plug coupled to the engine, an intake passage configured to deliver said first portion of heated intake air to the engine and to deliver a second portion of intake air which bypasses said heat source, and a controller configured to direct said second portion of intake air to the engine at least when utilizing said spark plug to initiate combustion and flame propagation of an air-fuel mixture, and to at least temporarily cause said first portion of intake air to flow during said spark ignition combustion so that a temperature of said first portion of intake air is maintained above a selected value.

16 Claims, 4 Drawing Sheets

SYSTEM AND METHOD FOR MAINTAINING HEATED INTAKE AIR

FIELD

The present application relates to controlling engine operation during transitions between combustion modes.

BACKGROUND AND SUMMARY

An internal combustion engine may utilize various types of combustion. For example, spark ignition (SI) of a homogenous mixture during the expansion stroke is one example. This method relies on a timed spark from a sparking plug in order to achieve ignition of an air/fuel mixture within the combustion chamber. Another type of combustion is homogeneous charge compression ignition (HCCI), which occurs when the temperature of the air/fuel mixture within combustion chamber attains the autoignition temperature of the specific fuel. HCCI can be used to provide greater fuel efficiency and reduced NOx production under some conditions.

In one example approach utilizing HCCI combustion, heat exchangers may be used to extract energy from the exhaust or engine coolant to heat a portion of the intake air and thereby provide heated air for attaining autoignition as utilized during the HCCI mode. In addition, unheated air may also be provided. Such a system is described in U.S. Pat. No. 6,675,579, for example.

In the above system, when the engine operates in SI mode, unheated air may be used to reduce engine knock while achieving desired engine performance. However, the inventors herein have recognized that the heated air in the hot-air passage may become stagnant and therefore gradually cool during such operation. As a result, the stagnant air in the hot-air passage may be of insufficient temperature or contain insufficient energy to achieve autoignition of the air/fuel mixture when needed. Under such conditions, when transitioning from SI mode to HCCI mode, combustion in the HCCI mode may be degraded until the "cooled" hot air is purged from the system and heated air reaches the engine. Alternatively, the HCCI mode may be delayed until such air may be purged, thus delaying the desired transition.

As such, in one embodiment, a system for an internal combustion engine, the engine having an intake and exhaust manifold, the system comprising of a heat exchanger configured to extract energy from at least a heat source that heats a first portion of intake air, a spark plug coupled to the engine, an intake passage configured to deliver said first portion of heated intake air to the engine and to deliver a second portion of intake air which bypasses said heat source, and a controller configured to direct said second portion of intake air to the engine at least when utilizing said spark plug to initiate combustion and flame propagation of an air-fuel mixture, and to at least temporarily cause said first portion of intake air to flow during said spark ignition combustion so that a temperature of said first portion of intake air is maintained above a selected value.

In this way, it is possible to maintain a ready reserve of heated air in the hot-air passage thus providing the energy necessary for attaining autoignition of the air/fuel mixture when performing a substantially rapid transition from SI mode to HCCI mode.

DETAILED DESCRIPTION OF THE DRAWINGS

DETAILED DESCRIPTION

Figure 1:
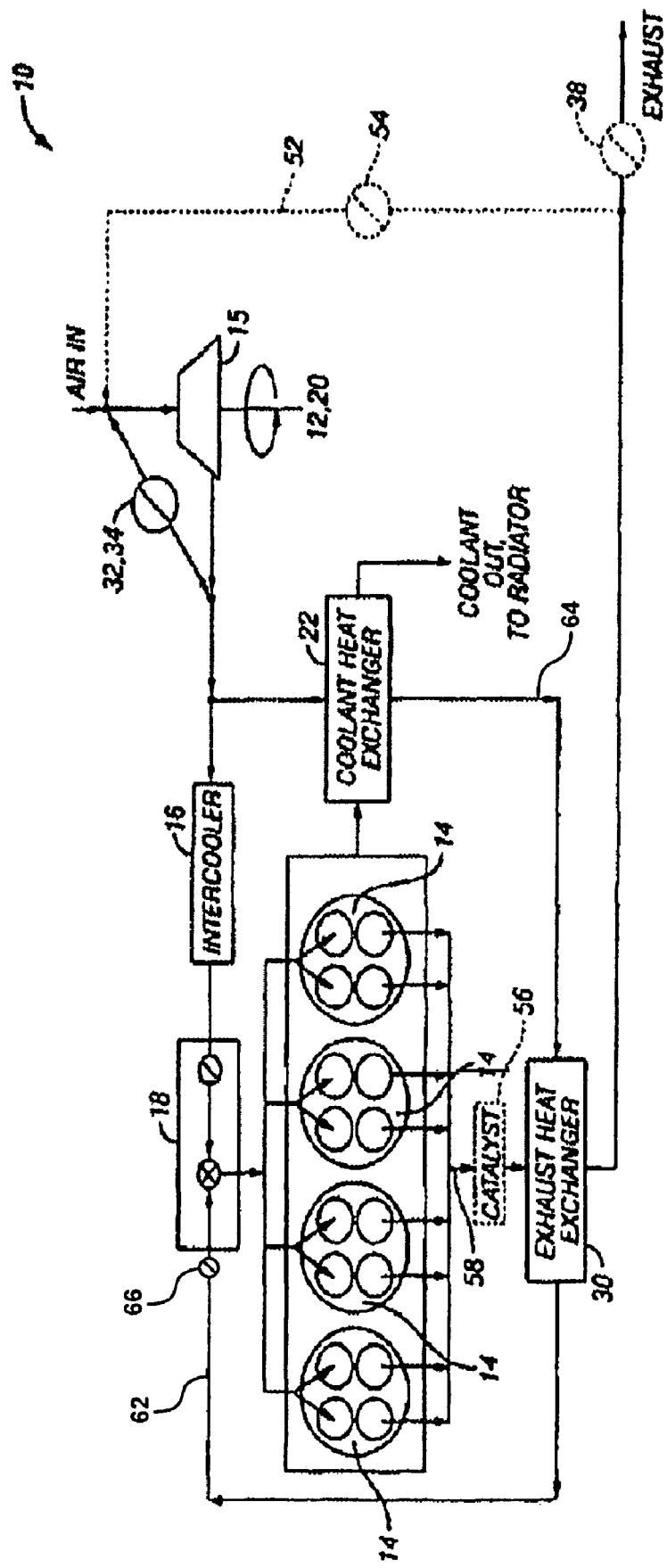
FIG. 1 is a schematic block diagram of an example embodiment of an intake/exhaust system with intake heating.

Referring to FIG. 1, a first embodiment of intake/exhaust system 10 with intake heating, inlet temperature and pressure controls, and intake air pressure boost using a supercharger 12 or an E-booster, are disclosed. For the embodiment of FIG. 1, the compressed intake air via air compressor 15 may include two flow paths (or routes) to engine cylinders 14. The first path may be through an intercooler 16, and then to control valves 18 and engine cylinders 14. Airflow through this path would be unheated air. The second path may be through coolant heat exchanger 22 and exhaust heat exchanger 30, and then to control valves 18 and engine cylinders 14. Various types of heat exchangers may be used, such as air to air or air to liquid. Airflow through this path would be heated air. In some examples, the arrangement of air through either intercooler 16 or through coolant heat exchanger 22 and exhaust heat exchanger 30 would allow low intake temperature operation in SI mode to reduce knock, and would reserve the thermal energy in the compressed air for HCCI combustion. In other examples, heated intake air may be utilized in SI mode during cold start and/or engine warm-up operations. The mass ratio of the heated and unheated air streams to control valves 18 and engine cylinders 14 may also be varied to control the intake air temperature. In this manner knock may be reduced through control of the combined air intake temperature.

Exhaust heat exchanger 30 is shown supplying heated air to control valves 18 through hot air passage 62. Bleed valve 66 is shown configured along hot air passage 62 substantially near control valves 18 for purging heated air from the hot air passage by the compressor 15. Further, coolant heat exchanger 22 is shown supplying air through passage 64 to exhaust heat exchanger 30. In some embodiments, intake/exhaust system 10 may utilize a single heat exchanger to supply heated air to the engine. For example, a single exhaust heat exchanger, coolant heat exchanger or other type of heat exchanger may be utilized to perform the function heating the air. An improved hot air passage 62 and passage 64 for providing a ready reserve of heated air to the engine when transitioning between combustion modes will be discussed below with reference to FIG. 4.

The intake air pressure may be controlled using conventional control valves and air compressor 15. Referring to FIG. 1, if a supercharger 12 is used (i.e. air compressor 15 is mechanically driven by the engine), a pressure release valve 32 may be used and opened when boosting is not needed to control the pressure downstream of supercharger 12. As discussed above, if instead of a supercharger 12 an E-booster is used (i.e. air compressor 15 is driven by an electrical motor), instead of pressure release valve 32, a bypass valve 34 may be used for opening when boosting is not in need and when E-booster is deactivated. Bypass valve 34 may preferably open simultaneously with the deactivation of E-booster 20, and likewise, close simultaneously with the activation of E-booster 20. Intake/exhaust system 10 of FIG. 1 may optionally employ an exhaust gas recirculation (EGR) line 52 and EGR control valve 54. A catalyst 56 may be placed between the engine exhaust port 58 and heat exchanger 30. Various types of catalysts may be used, such as three way catalysts, NOx traps, particulate filters or lean NOx catalysts among others. Further, the catalyst may be in a close-coupled location in the engine exhaust.

For some HCCI engines, a large valve overlap (i.e. the overlap of the intake and exhaust events) is used during HCCI operation. During the application of intake pressure boosting near the high-torque boundary of the HCCI operating region, some fresh air in engine cylinders 14 may flow out to the exhaust port due to the pressure difference. To reduce the associated losses due to such fresh airflow to the exhaust port, the valve overlap may preferably be reduced for applications requiring intake pressure boosting. Alternatively, an exhaust backpressure control valve 38, as shown in FIG. 1, may be applied to raise the exhaust pressures and reduce the loss of fresh air in engine cylinders 14.

However, other configurations of intake/exhaust system 10 may be utilized. For example, for the system described above, three-way control valves may be provided for controlling the mass ratio of air through the throttle to thereby control temperature and pressure of air supplied to the engine. Each of the three way valves may include two input air flow paths and one output air flow path for supplying air to the engine. One of the input air flow paths may receive air controlled by the throttle, the other one of the input air flow paths may receive air from the heat exchanger.

Alternatively, for an engine including at least two intake valves and at least one exhaust valve, the system may include at least one variable valve timing device for controlling at least one of the intake valves to control the mass ratio of air supplied to the intake valves to thereby control temperature and pressure of air supplied to the engine. A first variable valve timing device may control a first intake valve, thereby controlling the supply of air through the throttle to the first intake valve. A second variable valve timing device may control a second intake valve, thereby controlling the supply of air through the heat exchanger to the second intake valve. Alternatively, the system may include at least one port throttle for controlling air flow to at least one of the intake valves to control the mass ratio of air supplied to the intake valves to thereby control temperature and pressure of air supplied to the engine. A first port throttle may control air flow to a first intake valve, thereby controlling the supply of air through the throttle to the first intake valve. A second port throttle may control air flow to a second intake valve, thereby controlling the supply of air through the heat exchanger to the second intake valve.

In another configuration, the system may include at least one additional throttle for controlling air flow to each of the intake valves to control the mass ratio of air supplied to the intake valves to thereby control temperature and pressure of air supplied to the engine. The additional throttle may control air flow through the second air flow path. Thereafter, air within the first and second air flow paths may be mixed and supplied to the intake valves. Alternatively, the additional throttle may control air flow to one of the intake valves to control air supplied to the intake valve and to thereby control temperature and pressure of air supplied to the engine. The additional throttle may control air flow through the second air flow path. Thereafter, air within the first air flow path may be directly supplied to another one of the intake valves.

The invention further provides a method of controlling intake air temperature and pressure in a dual-mode homogeneous charge compression ignition (HCCI) engine having intake and exhaust manifolds. The method may include supplying air to the engine via at least two air flow paths, cooling air in one of the air flow paths and heating air in another one of the air flow paths through the addition of thermal energy. The method may further include controlling the mass ratio of air through the air flow paths to thereby control temperature and pressure of air supplied to the engine, and boosting intake pressure of air supplied to the engine. In this manner, air at a first temperature may be supplied to the engine for operation SI mode and air at a second temperature may be supplied to the engine for operation in HCCI mode.

The method described above may further include utilizing a supercharger for compressing air supplied to the engine and thereby boosting intake pressure of air supplied to the engine, and controlling pressure downstream of the supercharger by means of a pressure release valve. Alternatively, the method may include utilizing an E-booster for compressing air supplied to the engine and thereby boosting intake pressure of air supplied to the engine, and controlling pressure downstream of the E-booster by means of a bypass valve. The bypass valve may be closed upon activation of the E-booster and opened upon deactivation of the E-booster. Alternatively, the method may include utilizing a turbocharger for compressing air supplied to the engine and thereby boosting intake pressure of air supplied to the engine. The method may further include controlling operation of the turbocharger by means of an exhaust bypass valve, located downstream of the turbocharger, operable in conjunction with an intake bypass valve, located upstream of the turbocharger.

The method may further include directing exhaust gas from an exhaust heat exchanger to an air compressor via an exhaust gas recirculation (EGR) line, and controlling flow of exhaust gas through the EGR line by means of an EGR control valve. In another embodiment, the method may include controlling flow of cooled air by means of a throttle, and controlling the mass ratio of air through the throttle by means of a plurality of three-way control valves to thereby control temperature and pressure of air supplied to the engine. Each of the three way control valves may include two input air flow paths and one output air flow path for supplying air to the engine. One of the input air flow paths may receive air controlled by the throttle, the other one of the input air flow paths may receive air from a heat exchanger.

In yet another embodiment, the method may include controlling flow of cooled air by means of a throttle, and controlling the mass ratio of air supplied to at least one of the intake valves by means of at least one variable valve timing device to thereby control temperature and pressure of air supplied to the engine. A first variable valve timing device may control a first intake valve, thereby controlling the supply of air through the throttle to the first intake valve. A second variable valve timing device may control a second intake valve, thereby controlling the supply of air through a heat exchanger to the second intake valve. Alternatively, the method may include controlling flow of cooled air by means of a throttle, and controlling the mass ratio of air supplied to at least one of the intake valves by means of at least one port throttle to thereby control temperature and pressure of air supplied to the engine. A first port throttle may control flow past a first intake valve, thereby controlling the supply of air through the throttle to the first intake valve. A second port throttle may control flow past a second intake valve, thereby controlling the supply of air through a heat exchanger to the second intake valve.

In this manner, the invention shown in FIG. 1 may utilize a first air flow path that directs air to the engine via an intercooler and the second air flow path may direct air to the engine via a heat exchanger, such that air at a first temperature is supplied to the engine for operation during cold start or warm-up in SI mode and air at a second temperature is supplied to the engine for operation in HCCI mode.

In some embodiments of the invention, during engine cold start the method described above may include utilizing SI mode during the initial warm-up period wherein the contribution of air warmed by the heat exchanger is maximized for a desired number of engine cycles until the intake air temperature reaches a temperature substantially near autoignition. Thereafter, the contribution of heated air may be reduced while simultaneously increasing the contribution of cool/ambient air to reduce engine knock. When the engine and catalyst reach a desired temperature, the contribution of heated air may be increased and a transition to HCCI mode may commence. During HCCI operations the intake air temperature may be regulated by the contribution of cool/ambient and heated air in order to reach the autoignition temperature of the air/fuel mixture at the desired combustion timing, wherein the combustion air-fuel mixture ratio may be lean, rich, or stoichiometric.

In some example, it may be possible to control the amount of heat transferred from the exhaust gas or engine coolant to heat the intake air, such as by controlling an amount of coolant flow, or amount of cross flow in heat exchangers 22 and 30, among others.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine controller.

Figure 2:
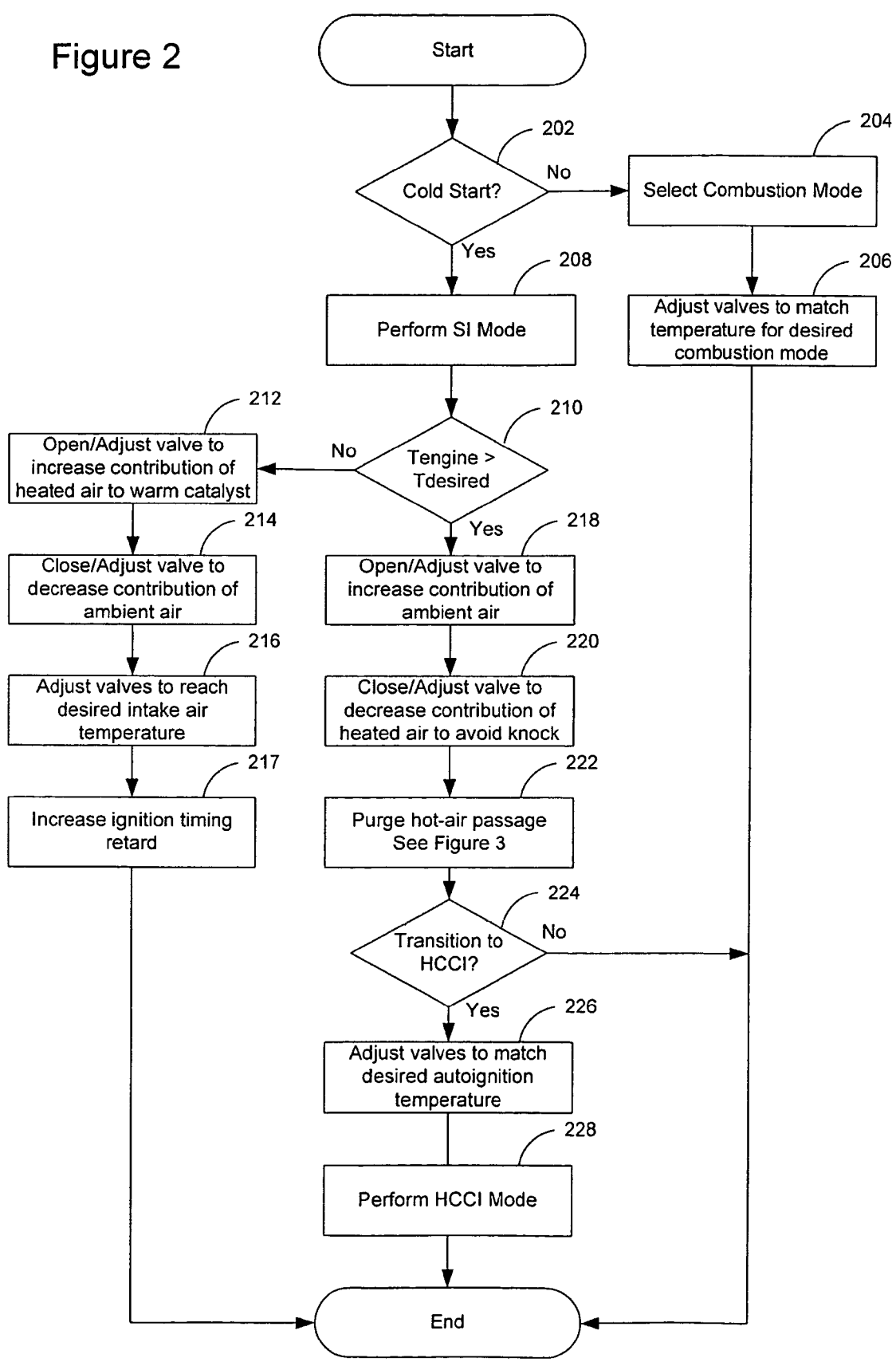
FIG. 2 is a flow chart of an example method for controlling the contribution of warm and cool/ambient intake air.

Referring to FIG. 2, a flow chart of an example method for controlling the contribution of heated and cool/ambient intake air is shown. Beginning at step 202 it is judged whether a cold start and/or warm-up condition exists. If the answer to step 202 is no, the routine proceeds to step 204, where a desired combustion mode is selected. The combustion mode may include homogenous spark ignition operation, or homogeneous charge compression ignition, depending on various conditions such as engine speed, engine load, catalyst temperature, and others. Next, the routine proceeds to step 206, where the contribution of heated and cool/ambient intake air is matched to the operating temperature of the desired combustion mode. From step 206, the routine ends.

Alternatively, if the answer to step 202 is yes, the routine proceeds to step 208 where SI mode is selected. During engine cold start and warm-up periods, hydrocarbon emissions may be increased due to decreased fuel atomization, and reduced catalyst conversion efficiency. Therefore, it can be desirable to warm the engine and catalyst quickly in order to reduce hydrocarbon emissions, as described below. Also, under some starting conditions, an approximately stoichiometric air/fuel mixture may be combusted. Under other conditions, a lean, or slightly lean, air/fuel ratio may be combusted, such as within one air/fuel ratio of stoichiometry.

Next, the routine proceeds to step 210, where it is judged whether the engine temperature (e.g., exhaust temperature, catalyst temperature, engine coolant temperature, etc.) has reached a desired temperature where the catalyst is sufficiently heated and adequate fuel atomization may occur. In addition, at step 210 may also determined whether the exhaust temperature is above a desired temperature before introducing heated air. Further, the routine may also determine whether the engine has operated for a predetermined number of combustion cycles, or whether the heated air has reached a desired temperature.

If the answer to step 210 is no, the routine proceeds to step 212, where the control valves controlling the contribution of heated air is opened or adjusted in order to promote rapid warming of the engine and catalyst. Also, if equipped, the routine can also adjust the heat exchanger(s) to increase the amount of thermal energy transferred to the heated intake air. Next, the routine proceeds to step 214, where the valve controlling the contribution of cool/ambient intake air is closed or adjusted in order to decrease the contribution of cool/ambient air, thereby further increasing exhaust gas temperature. Next, the routine proceeds to step 216, where the control valves are dynamically adjusted to maintain a desired air intake temperature. The control valves may include a single shared valve or multiple valves in order to control intake air temperature. Then, in step 217, ignition timing is further retarded as the temperature of the heated intake air increases and is increasingly added to the intake manifold. For example, the amount of additional spark retard may be proportional to the amount and/or temperature of heated intake air added to the cylinders. From step 217, the routine ends.

In this way, it is possible to utilize the thermal energy extracted from the exhaust gas from the initial combustion firings to add thermal energy to the intake air inducted during later combustion events. This increased intake air temperature can enable improved fuel atomization and combustion stability, thereby enabling increased ignition timing retard and increased exhaust temperature. In other words, during conditions where the temperature of the engine or catalyst is below a desired temperature, the engine cylinders may be operated with retarded ignition timing to further increase exhaust gas temperature as the amount of retard that can be tolerated may be limited by combustion stability. Thus, the warmed air can increase fuel atomization and vaporization during cold engine conditions, thereby increasing the amount of ignition retard, at least under some conditions. Further, the increased intake air temperature itself can promote increased exhaust gas temperature.

Alternatively, if the answer to step 210 is yes, the routine proceeds to step 218 where the valve controlling the cool/ambient intake air is opened or adjusted to increase the contribution of cool/ambient air, and any additional spark retard added from step 217 is ramped out. Next, the routine proceeds to step 220, where the valve controlling the contribution of heated intake air is closed or adjusted to reduce knock during SI combustion mode. If desired, ignition timing retard may also be combined with such control to further reduce knock. Next, the routine proceeds to step 222 where the hot-air passage is purged so that the stagnant air unused during SI mode does not begin to cool or is not utilized in subsequent compression ignition cycles. Purging of the hot-air passage may be performed using several approaches and will be discussed below in more detail with reference to FIGS. 3 and 4. Next, the routine proceeds to step 224, where it is judged whether to transition to HCCI mode. If the answer to step 224 is no, the routine ends. Alternatively, if the answer to step 224 is yes, the routine proceeds to step 226 where the air intake valves are adjusted to match a desired temperature or the autoignition temperature. Next, at step 228 HCCI mode is performed when the operating conditions of the engine are sufficient to attain autoignition of the air/fuel mixture. From step 228, the routine ends.

In this manner, rapid heating of the engine and catalyst may occur while simultaneously reducing engine knock when operating in SI mode.

An engine that utilizes a dual mode operation such as with SI and HCCI modes may under some conditions perform transitions between modes in order to gain the benefits of each mode. For example, at higher loads the engine may transition to SI mode from HCCI operation. In another example, such as during cold start as discussed above with reference to FIG. 2, engine warm up may be performed in SI mode and later transition to HCCI mode when the engine is warmed to a temperature necessary for autoignition. During such transitions, a ready reserve of heated air may be used to facilitate the transition by rapidly increasing the air intake temperature such that autoignition is attained. While energy may be transferred to the air moving through the heat exchanger, some engine operations may utilize less heated air or air that is unheated (such as with SI mode). Therefore, during such conditions the air in the hot-air passage may become stagnant, thus giving up some of the thermal energy that was gained by the heat exchanger. To this end, several approaches may be utilized to maintain a ready reserve of heated air.

Figure 3:
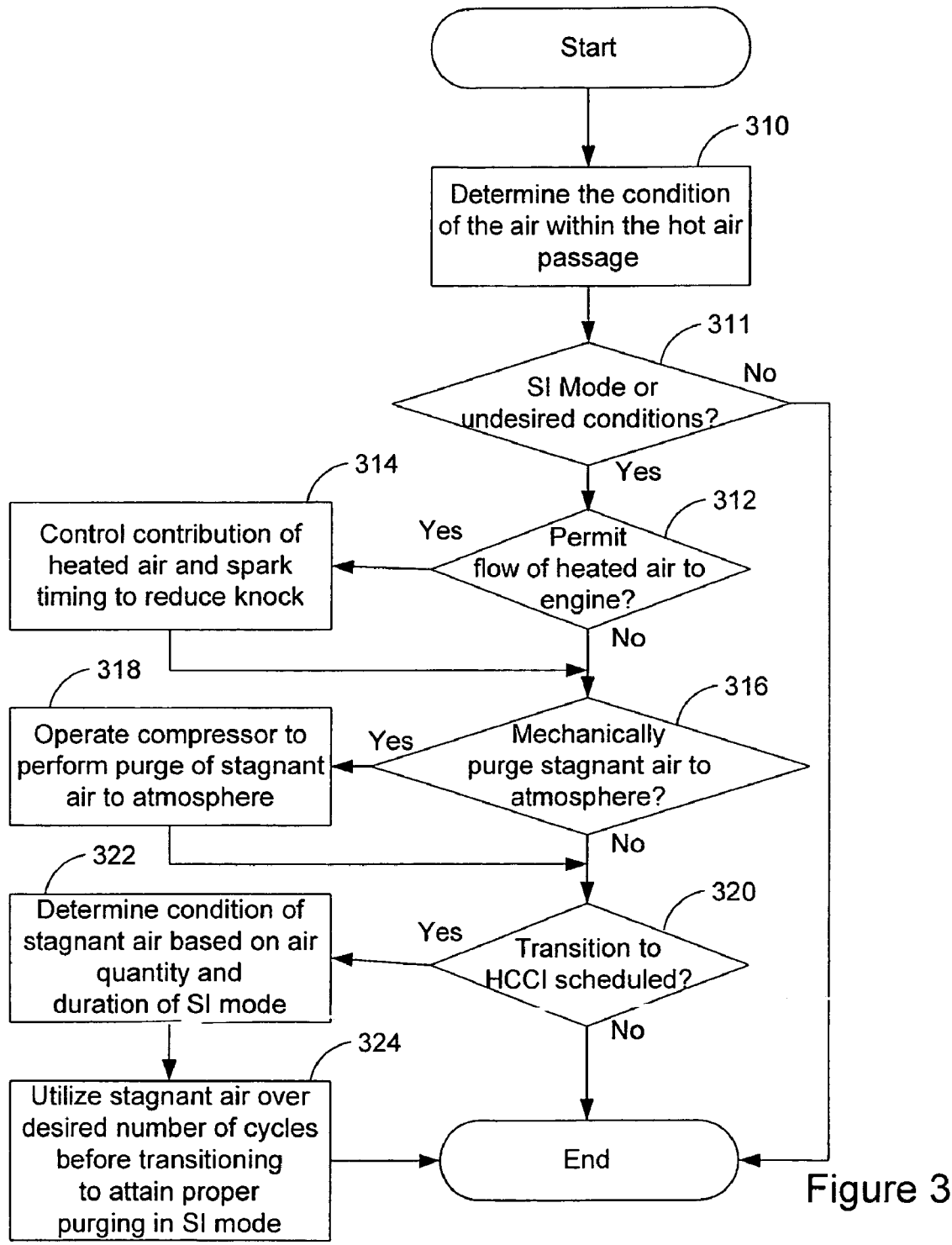
FIG. 3 is a flow chart of an example method for maintaining a ready reserve of heated air for transitions between operating modes.

Referring now to FIG. 3, a flow chart of an example method for maintaining a ready reserve of heated air is shown. In particular, the method described below may use several approaches for purging the stagnant air from the hot air passage. In some examples, purging may be utilized when the contribution of heated air flowing from the hot air passage is less than a minimum value necessary for maintaining a desired heated air condition.

Beginning with step 310, the condition of the heated air within the hot air passage is determined so that a purge strategy may be chosen at steps 312, 316 or 320. The condition of the heated air may be determined through a variety of ways. For example, a temperature sensor may be used to directly measure the temperature of the heated air within the hot air passage. Thus, as the measured temperature falls below a threshold, a purge may be requested. Alternatively, a prescribed number of engine cycles or the duration of SI mode may be used to determine purging strategy. A variety of other conditions may also be used to determine the method or timing of purging such as engine temperature, operating mode, engine speed, and engine load among various others. Next, the routine proceeds to step 311.

At step 311, it is judged whether the engine is operating in SI mode or if a specified condition exists with the heated air as determined in step 310. Therefore, if the engine is operating in SI mode, the routine proceeds to step 312. Also, if a specified condition is judged to exist, such as with a lower than desired temperature, the routine proceeds to step 312. For example, when the valve controlling the heated air contribution is substantially reduced or closed, the air within the hot air passage may become stagnant, thus the routine may proceed to step 312 irregardless of combustion mode. However, if the answer at step 311 is no i.e. the engine is in a mode other than SI mode and the condition of the heated air is sufficient, the routine ends.

Next, at step 312 a first approach to purging the heated air may be used as it is judged whether to permit the flow of heated air to the engine. In some examples, such as during periods of high load in SI mode, the flow of heated air to the engine may be restricted in order to inhibit engine knock. Alternatively, during periods of low load, a small amount of heated air may be permitted to flow to the engine. In this manner, the heated air will continue to flow through the heat exchanger and the hot air passage such that it stagnation is reduced. Alternatively, the heated air may temporarily flow to the engine, but to a greater extent at lower loads than higher loads. For example, the air may flow at a greater/lesser frequency with engine load, or at a fixed frequency of greater or lesser amounts, or combinations thereof.

If the answer to step 312 is yes, the routine proceeds to step 314, where the contribution of heated air is controlled so that engine knock is reduced, yet sufficient flow is maintained so that the air in the hot air passage does not become stagnant. For example, when operating in SI mode, heated air may be permitted to flow to the engine in order to reduce the potential for stagnant air within the hot air passage. Further, the spark timing may be adjusted as necessary to reduce engine knock while maintaining a sufficient flow of heated air.

A flow sufficient to maintain a ready reserve of heated air of a desired temperature may be accomplished by permitting a continuous, temporary and/or periodic flow of heated air to the engine. For example, at low engine loads, a small continuous contribution of heated air may be supplied to the engine during SI mode in order to achieve a ready reserve of heated air for transition to HCCI mode. As engine load increases, the continuous contribution may be reduced to reduce engine knock when operating in SI mode. Further, if engine load is increased, the contribution of heated air may be further reduced until the control valve supplying the heated air is fully closed. Thereafter, spark timing and various other methods of engine control may be used to further reduce engine knock. Therefore, if engine knock is detected, the continuous flow of heated air may be further reduced or stopped as necessary while the ambient/cool air is utilized to make up the difference.

In other examples, a temporary flow, which lasts for a prescribed duration may be permitted when certain conditions are met such as with certain engine loads, engine speed, duration of SI mode, and engine coolant temperature among various others. For example, if engine knock is detected, the duration of the temporary flow of heated air may be reduced as necessary to reduce knock.

Alternatively, a periodic flow may be permitted wherein a contribution of heated air flows to the engine for a prescribed duration and then is stopped for a prescribed duration. In this manner, a periodic opening and closing of the valves controlling the contribution of heated air may be used to purge the hot air passage.

Alternatively, if the answer to step 312 is no (such as with operation at high load due to the increased potential for engine knock) the routine proceeds to step 316 where a second approach may be used. At step 316 it is judged whether to mechanically purge the stagnant air in the hot-air passage. In some examples, the intake system may contain an air compressor that can be used to intermittently purge the stagnant air out of the hot-air passage through a bleed valve that is located substantially near to the engine intake valve(s). In some examples, the system may include a plurality of bleed valves. Thus the timing and duration of the intermittent purging process may be varied according to the volume and/or temperature of the air in the hot-air passage or the duration of the particular combustion mode among others.

If the answer to step 316 is yes, the compressor performs a mechanical purge at step 318 in order in order to clear or reduce the stagnant air from the hot-air passage. Further, this purge may be continuous, temporary and/or periodic. For example, the compressor may operate continuously during SI mode in order to maintain at least a small flow of heated air through the bleed valve. Alternatively, a temporary purge may be utilized during operations where a transition to HCCI is desired or predicted to occur. In other examples, the compressor may be utilized periodically or intermittently during SI mode to purge the stagnant air from the hot air passage. This periodic purging may occur at a prescribed time interval or after a prescribed number of engine cycles or as necessary to maintain a desired condition of the heated air, such as temperature. Further, the mechanical purge may be controlled by controlling both the purge duration and/or purge frequency. Further discussion of the mechanical purging process and associated purging system will be discussed below with reference to FIG. 4.

Next, the routine proceeds to step 320 or if the answer to step 316 is no, the routine proceeds to step 320. At step 320 it is judged whether a transition to HCCI mode has been requested. If the answer to step 320 is no, the routine ends. Under some conditions, the routine may return to previous step, in order to remove the stagnant air from the hot air passage. Alternatively, if the answer to step 320 is yes, the routine proceeds to step 322.

At step 322 the contribution of heated air and the number of cycles used to adequately purge the hot air passage is determined. This determination may utilize several factors such as the volume of the hot air passage, the duration of the present SI mode, the temperature of the air within the hot-air passage, and the time lapsed since last purge among various others. For example, a temperature sensor located in the hot-air passage may be used to determine the temperature of the stagnant air. However, under some conditions it may be advantageous to use an indirect method for detecting temperature. For example, the duration of the SI mode, the measured ambient conditions and/or the known volume of the hot-air passage could be used by the controller to estimate the temperature of the stagnant air. Therefore, in some embodiments, an indirect method may be used to determine the amount of purging necessary to achieve autoignition.

Next, at step 324 a contribution of air from within the hot air passage may be utilized for at least one cycle of SI mode operations prior to transitioning to HCCI mode. In one embodiment, a transition to HCCI is predicted in advance based on rates of changes of parameters such as load and engine speed, so that at least a predetermined number of cycles in the SI mode may be performed before transitioning. In this way, it may be possible to utilize a sufficient amount of stagnant air before transitioning so that heated air at a desired temperature is present for HCCI combustion. Next, the routine ends.

Thus, several approaches may be utilized for the removal of stagnant air from the hot air passage when operating in SI mode or at any time the condition of heated air is undesirable. In this manner, a ready reserve of heated air may be maintained within the hot air passage for a substantially rapid transition to HCCI mode wherein autoignition is attained.

Figure 4:
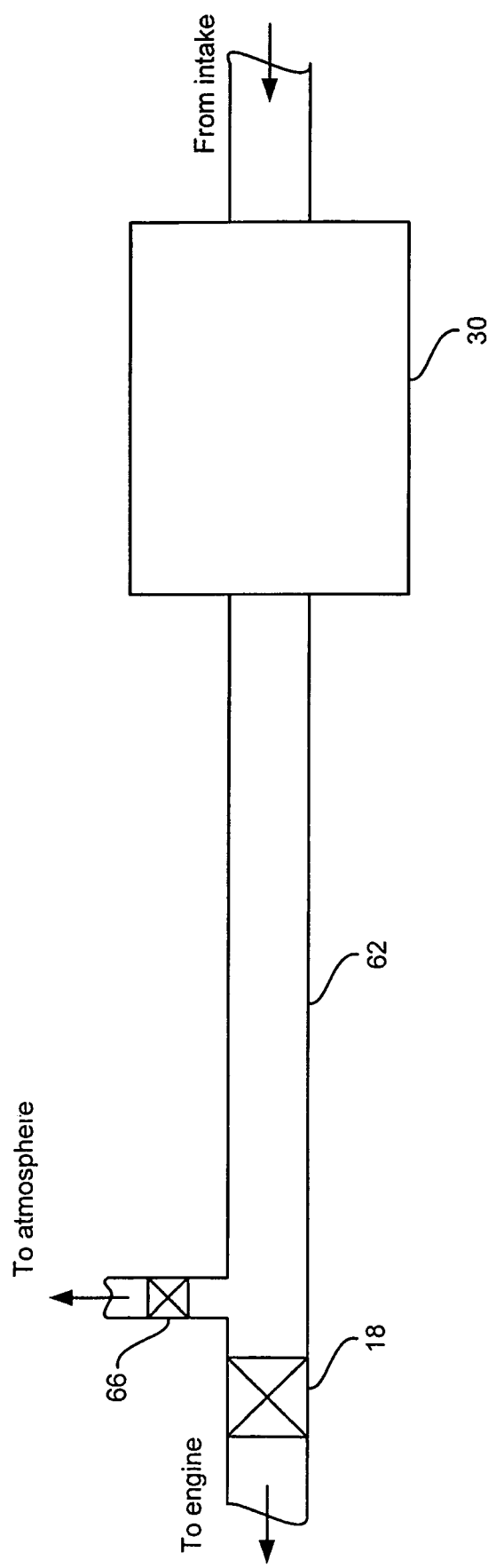
FIG. 4 is an alternative example engine intake configuration.

Referring now to FIG. 4, hot air passage 62 located between heat exchanger 30 and control valves 18 are shown. FIG. 4 shows air flow from right to left through heat exchanger 30 where the air is heated through the transfer of thermal energy. As shown in FIG. 1, heat exchanger 30 may utilize an air to air system wherein thermal energy is transferred from the exhaust gas to the intake air. In other embodiments, a fluid to air heat exchanger 22 may be utilized in place of the air to air heat exchanger 30 as described above with reference to FIG. 1 wherein engine coolant may be utilized to transfer thermal energy to the intake air. Further, various other methods of heating the intake air may be utilized in place of heat exchanger 30. For example, a single fluid heat exchanger may be used or alternatively active heating such as through the use of electrical resistance or a burner among others may be utilized.

As the heated air leaves the heat exchanger, it passes through a hot air passage before reaching control valves 18 wherein the contribution of heated air and ambient/cool air is controlled prior to reaching the engine. Further, a bleed valve 66 is shown configured substantially near control valves 18 for purging air from the hot air passage. Since the bleed valve is configured substantially near the end of the hot air passage, air permitted to flow out through bleed valve 66 would be sufficient to purge nearly all of the hot air passage. In this manner, as control valves 18 substantially reduce or stop the contribution of heated air, the bleed valve may be used to purge the stagnant air.

In some embodiments, wherein a two stage heat exchanger is utilized as described above with reference to FIG. 1, a second bleed valve may be configured in passage 64 connecting heat exchanger 22 and 30 of FIG. 1. Further, the second bleed valve may be configured substantially near heat exchanger 30 for purging passage 64 upon receiving a signal from the engine controller. In this manner, as control valves 18 substantially reduce or stop the contribution of heated air, the second bleed valve may be used to purge stagnant air from passage 64.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Further it could be applied to various types of valve actuators, such as electrically actuated valves, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system for an internal combustion engine, the engine having an intake and exhaust manifold, the system comprising:
   a heat exchanger configured to extract energy from at least a heat source that heats a first portion of intake air;
   a spark plug coupled to the engine;
   an intake passage configured to deliver said first portion of heated intake air to the engine and to deliver a second portion of intake air which bypasses said heat source;
   a controller configured to direct said second portion of intake air to the engine at least when utilizing said spark plug to initiate combustion and flame propagation of an air-fuel mixture, and to at least temporarily cause said first portion of intake air to flow during said spark ignition combustion so that a temperature of said first portion of intake air is maintained above a selected value.

2. The system of claim 1, wherein the heat source is an exhaust gas of the engine.

3. The system of claim 1, wherein the heat source is an engine coolant.

4. The system of claim 1, wherein the heat source is an exhaust gas and an engine coolant.

5. The system of claim 1, wherein said first portion is directed to flow to the engine.

6. The system of claim 1, wherein said first portion is directed to flow to an environment surrounding the engine.

7. The system of claim 5, wherein said first portion is directed to flow before transitioning said engine to carry out auto-ignition.

8. The system of claim 7, wherein said first portion of intake air is increased when transitioning to carry out auto-ignition.

9. The system of claim 1, wherein said first portion is directed to flow to the engine during cold starting operation.

10. The system of claim 1, wherein said first portion is directed to flow to the engine periodically.

11. The system of claim 10, wherein timing of said spark ignition is retarded when said first portion flows to the engine.

12. The system of claim 1, wherein said temperature is a temperature of said first portion of intake air between the heat source and the intake passage.

13. A method of controlling engine operation of an engine configured to induct a first airflow that receives more heat from a heating source, and to induct a second airflow that receives less heat from said heating source, the method comprising:
   during a first condition, inducting air primarily from said second airflow into the engine, and performing spark ignition of said inducted air and fuel, where during at least a portion of said first condition, at least a portion of said first airflow is allowed to flow to prevent a temperature of said first airflow to decrease below a desired amount; and
   during a second condition, inducting air from said first airflow and said second airflow into the engine, and performing controlled auto-ignition of said inducted air and fuel.

14. The method of claim 13, wherein it is determined that said temperature decreased below said desired amount if said first airflow is less than a threshold amount for a predetermined duration.

15. The method of claim 13, wherein it is determined that said temperature decreased below said desired amount if said first airflow is stagnant for a predetermined duration.

16. The method of claim 13, wherein an amount of said first airflow during said first condition is less than an amount of said second airflow.

* * * * *